United States Patent
Shroff Rama et al.

(10) Patent No.: US 10,030,193 B2
(45) Date of Patent: Jul. 24, 2018

(54) CONSOLIDATION COMPOSITIONS COMPRISING MULTIPODAL SILANE COUPLING AGENTS

(71) Applicant: Halliburton Energy Services, Inc., Houston, TX (US)

(72) Inventors: Mallikarjuna Shroff Rama, Pune (IN); Sumit Ramesh Songire, Pune (IN); Lalit Salgaonkar, Pune (IN)

(73) Assignee: Halliburton Energy Services, Inc., Houston, TX (US)

( * ) Notice: Subject to any disclaimer, the term of this patent is extended or adjusted under 35 U.S.C. 154(b) by 43 days.

(21) Appl. No.: 15/114,268

(22) PCT Filed: Jun. 18, 2014

(86) PCT No.: PCT/US2014/042847
§ 371 (c)(1),
(2) Date: Jul. 26, 2016

(87) PCT Pub. No.: WO2015/195105
PCT Pub. Date: Dec. 23, 2015

(65) Prior Publication Data
US 2017/0009126 A1    Jan. 12, 2017

(51) Int. Cl.
| | |
|---|---|
| *C09K 8/502* | (2006.01) |
| *C09K 8/575* | (2006.01) |
| *C09K 8/508* | (2006.01) |
| *C09K 8/565* | (2006.01) |
| *C09K 8/80* | (2006.01) |
| *C08G 59/18* | (2006.01) |

(Continued)

(52) U.S. Cl.
CPC ............ *C09K 8/5756* (2013.01); *C08G 59/18* (2013.01); *C09K 8/502* (2013.01); *C09K 8/508* (2013.01); *C09K 8/56* (2013.01); *C09K 8/565* (2013.01); *C09K 8/5751* (2013.01); *C09K 8/5755* (2013.01); *C09K 8/805* (2013.01); *E21B 43/267* (2013.01)

(58) Field of Classification Search
None
See application file for complete search history.

(56) References Cited

U.S. PATENT DOCUMENTS 3,378,071 A  *  4/1968  Sparlin ................ C09K 8/502
                                                        166/295
4,042,032 A  *  8/1977  Anderson ............ C09K 8/5086
                                                        166/276

(Continued)

FOREIGN PATENT DOCUMENTS

WO    WO 2015/147775    * 10/2015 ............... C09K 8/50

OTHER PUBLICATIONS

International Search Report and Written Opinion for PCT/US2014/042847 dated Feb. 12, 2015.
Gelest, Dipodal Silanes: Enhanced Substrate Adhesion, Nov. 2008.

*Primary Examiner* — Angela M DiTrani
(74) *Attorney, Agent, or Firm* — McDermott Will & Emery LLP

(57) ABSTRACT

Consolidation compositions comprising a multipodal silane coupling agent comprising at least two silane groups and at least one amino group; a curable resin; and a resin hardening agent. The curable resin is selected from the group consisting of an epoxy resin, an aliphatic epoxy resin, a glycidylamine epoxy resin, and combinations thereof.

25 Claims, 1 Drawing Sheet

(51) Int. Cl.
  *C09K 8/56* (2006.01)
  *E21B 43/267* (2006.01)

(56) References Cited

U.S. PATENT DOCUMENTS

| | | | |
|---|---|---|---|
| 5,911,282 | A | 6/1999 | Onan et al. |
| 7,013,976 | B2 | 3/2006 | Nguyen et al. |
| 7,235,683 | B2 | 6/2007 | Janeiro et al. |
| 7,306,037 | B2 * | 12/2007 | Nguyen .................. C09K 8/56 |
| | | | 166/295 |
| 8,551,924 | B2 | 10/2013 | Rickman et al. |
| 2003/0180479 | A1 | 9/2003 | Voeght et al. |
| 2005/0020758 | A1 | 1/2005 | Terry |
| 2010/0130687 | A1 * | 5/2010 | Tu ........................ C07F 7/1836 |
| | | | 525/104 |
| 2010/0163234 | A1 * | 7/2010 | Fuller .................... C09K 8/584 |
| | | | 166/278 |
| 2012/0040015 | A1 | 2/2012 | Lehtonen et al. |
| 2013/0310533 | A1 | 11/2013 | Bao et al. |
| 2014/0076558 | A1 | 3/2014 | Nguyen et al. |
| 2014/0162911 | A1 * | 6/2014 | Monastiriotis ......... C09K 8/805 |
| | | | 507/221 |
| 2014/0338906 | A1 * | 11/2014 | Monastiriotis ......... C09K 8/805 |
| | | | 166/280.2 |
| 2014/0357535 | A1 * | 12/2014 | Tang ...................... C09K 8/805 |
| | | | 507/219 |

\* cited by examiner

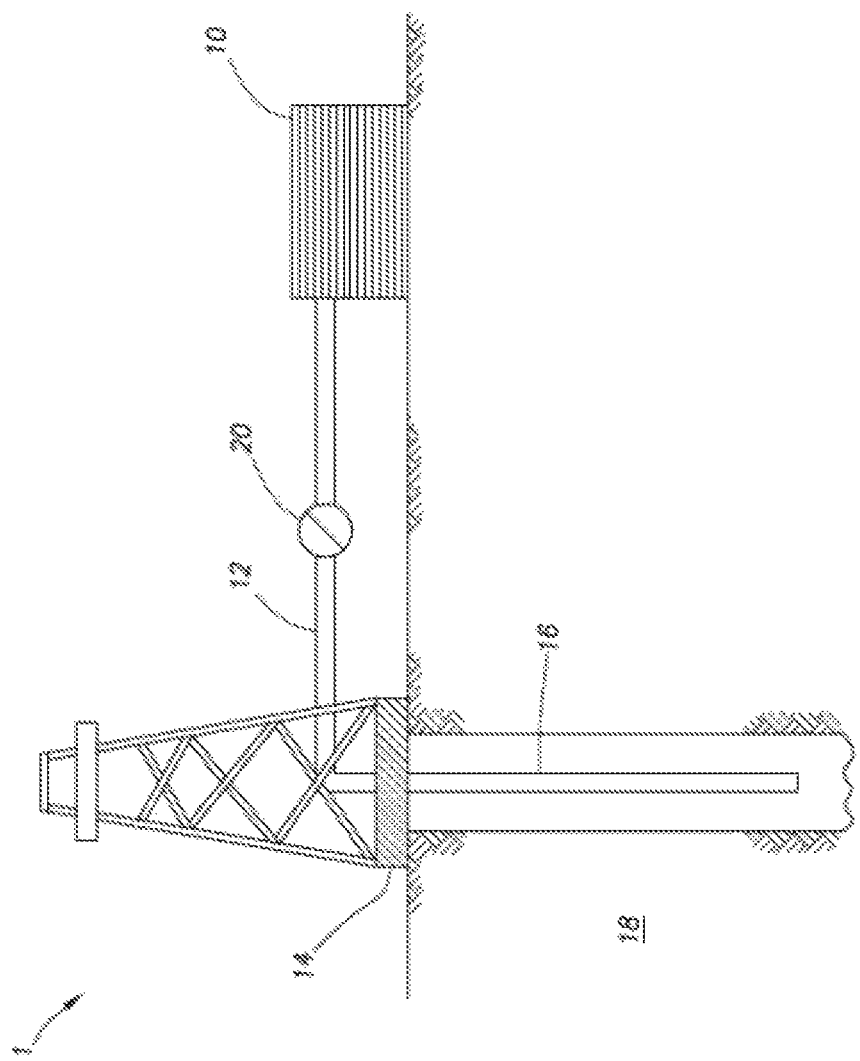

US 10,030,193 B2

CONSOLIDATION COMPOSITIONS COMPRISING MULTIPODAL SILANE COUPLING AGENTS

BACKGROUND

The embodiments herein relate to consolidation compositions comprising multipodal silane coupling agents and their use in subterranean formation operations.

Hydrocarbon wells are often at least partially located in unconsolidated portions of a subterranean formation. As used herein, the term "unconsolidated portion of a subterranean formation" refers to a portion of a subterranean formation that comprises loose particulate matter (e.g., formation fines, proppant, other introduced particulates, such as resin particulates, and the like) that can migrate out of the formation with, among other things, the oil, gas, water, and/or other fluids recovered out of the well. The particulate material in a relatively unconsolidated portion of a subterranean formation may be readily entrained by recovered fluids, for example, those wherein the particulates in that portion of the subterranean formation are bonded together with insufficient bond strength to withstand the forces produced by the production of fluids through those regions of the formation. The presence of particulate matter in the recovered fluids may be undesirable in that the produced particulates may abrade pumping and other producing equipment, reduce the fluid production capabilities of certain portions of a subterranean formation, require costly cleaning operations to remove the particulate matter from the recovered fluids, and the like. In addition, the particulate material may block the pore throats of a subterranean formation, thereby reducing the permeability of the formation (i.e., the ability of the formation to transmit fluid for recovery).

One approach to prevent or reduce the particulates from being produced with the formation fluids is the use of a gravel packing treatment. In a typical gravel packing treatment, one or more screens are mounted on a wellbore tubular and positioned in a wellbore drilled through a subterranean formation adjacent a desired production interval. An annulus is formed between the subterranean formation and the wellbore tubular. Specifically sized particulate material, referred to herein collectively as "gravel," is pumped as a slurry through the wellbore tubular and into the annulus. The gravel is deposited into the annulus around the screen and tightly packed therein to form a "gravel pack." The gravel is sized such that it forms a permeable mass that allows formation fluids therethrough but at least partially prevents or blocks the flow of unconsolidated particulates with the formation fluids. However, loose particulates may still escape the confines of the gravel pack and flow into the wellbore opening, limiting drawdown pressure. This may be particularly true if the loose particulates have a particularly broad size distribution, such that the gravel pack is not capable of preventing all of the particulates from migrating through the pack.

Another method used to mitigate the migration of particulates in subterranean formations involves adhering the particulates together in an area of interest in the subterranean formation, which is usually accomplished by treating the particulates with a traditional consolidation system, typically having a resin, a coupling agent (e.g., a single, or non-multipodal silane coupling agent), and a hardening agent. Consolidation treatments generally involve coating a resin around the surface of a loose particulate in a formation, which, when cured, holds the particulate in place in the formation and prevents or reduces its migration therein. Coating of loose particulates with traditional consolidation systems to prevent their migration in a formation may undesirably result in a reduction in the diameter (i.e., at least partial blockage) of the pore throats of the formation, thereby reducing the permeability of the formation. Accordingly, the productivity of the formation may be affected.

The decrease in the permeability of a subterranean formation comprising loose particulates treated with a traditional consolidation system may be particularly exacerbated in formations having a high concentration of formation fines and/or clays, which may generally be a subset of the loose particulates or indicative of the type of formation (e.g., one having a high composition of clay) and may significantly affect the production of the formation. The high concentration of the fines and/or clays in the formation results in a high surface area of the formation requiring coating, which thereby requires an increase in concentration of the resin to effectively provide consolidation. Accordingly, the permeability of the subterranean formation is further decreased due to pore blockage with the increased amount of resin, as compared to consolidation treatments in formations having a lower concentration of fines and/or clays.

BRIEF DESCRIPTION OF THE DRAWINGS

The following FIGURE is included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

The FIGURE shows an illustrative schematic of a system for delivering the treatment fluids having the consolidation composition described herein to a downhole location, according to one or more embodiments.

DETAILED DESCRIPTION

The embodiments herein relate to consolidation compositions comprising multipodal silane coupling agents and their use in subterranean formation operations. In particular, the embodiments herein relate to consolidation compositions comprising multipodal silane coupling agents that are able to consolidate loose particulates in a subterranean formation without substantially decreasing the permeability of the formation, even in the formations having a particularly high concentration of fines and/or clays, such as greater than 4%, greater than 10%, or even greater than 15% of the entire formation therein. As used herein, the term "loose particulates," or "formation particulates," encompasses any material that has sloughed off a subterranean formation, regardless of size. As used herein, the term "formation fines," or "fines," refers to a subset of loose/formation particulates (i.e., the term loose/formation particulates includes fines) that have a small size, typically smaller than about 70 microns and include, but are not limited to, formation material, fine clay, quartz, silts, or similar materials within the formation. A "high concentration" of formation fines in a subterranean formation, as used herein, may refer to a formation having greater than about 4% formation fines of the entire formation sand therein.

The multipodal silane coupling agents present in the consolidation compositions described herein are particularly effective at coupling resins to formation particulates, thereby permitting a reduced concentration (e.g., a thin layer applied on the fines) of the resin to be used without compromising consolidation effectiveness. Because such a reduced concentration, or thin layer, of resin is all that is required to consolidate the formation particulates due to the effectiveness of the multipodal silane coupling agent, the treated formation does not suffer from substantial permeability decreases, like traditional resin systems. This is particularly true in formations having a high concentration of formation fines, including clays, which have heretofore been very difficult or impossible to consolidate and maintain acceptable permeability regain for hydrocarbon production. For the same reasons, the effectiveness of the multipodal silane coupling agent allowing a reduced concentration of resin for consolidation to be used may be beneficial in low permeability formations. Moreover, the consolidation compositions comprising the multipodal silane coupling agent described herein exhibit increased consolidation strength when compared to resin systems that utilize non-multipodal silane coupling agents. Because of the properties of the multipodal silane coupling agent described herein, it may further be used in already consolidated formations (e.g., those using traditional coupling agent-resin systems) to further strengthen or improve the consolidation at the near wellbore region to prevent formation particulate migration under draw down pressures and provide long term stability to the formation.

As used herein, the term "multipodal silane coupling agent" refers to a coupling agent comprising at least two silane groups and at least one amino group. As used herein, the term "silane group" does not refer to a saturated hydrosilicon, but rather to a functional group comprising a silicon atom, which is capable of coupling to the surface of a formation particulate. As used herein, the term "amino group" refers to an organic functional group comprising a nitrogen atom, and having at least one hydrogen atom attached thereto.

One or more illustrative embodiments disclosed herein are presented below. Not all features of an actual implementation are described or shown in this application for the sake of clarity. It is understood that in the development of an actual embodiment incorporating the embodiments disclosed herein, numerous implementation-specific decisions must be made to achieve the developer's goals, such as compliance with system-related, lithology-related, business-related, government-related, and other constraints, which vary by implementation and from time to time. While a developer's efforts might be complex and time-consuming, such efforts would be, nevertheless, a routine undertaking for those of ordinary skill the art having the benefit of this disclosure.

It should be noted that when "about" is provided herein at the beginning of a numerical list, the term modifies each number of the numerical list. In some numerical listings of ranges, some lower limits listed may be greater than some upper limits listed. One skilled in the art will recognize that the selected subset will require the selection of an upper limit in excess of the selected lower limit. Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the exemplary embodiments described herein. At the very least, and not as an attempt to limit the application of the doctrine of equivalents to the scope of the claim, each numerical parameter should at least be construed in light of the number of reported significant digits and by applying ordinary rounding techniques.

While compositions and methods are described herein in terms of "comprising" various components or steps, the compositions and methods can also "consist essentially of" or "consist of" the various components and steps. When "comprising" is used in a claim, it is open-ended.

In some embodiments herein, a consolidation composition is provided comprising a multipodal silane coupling agent comprising at least two silane groups and at least one amino group, a curable resin, and a resin hardening agent. The multipodal silane coupling agent may be any compound provided that it comprises at least two silane groups and at least one amino group. Additionally, such multipodal silane coupling agents may be formed by any mechanism capable of producing such compounds in accordance with the requirements disclosed herein.

One mechanism for preparing a suitable multipodal silane coupling agent suitable for use in the consolidation compositions described herein is as follows, the multipodal silane coupling agent represented by Formula 1:

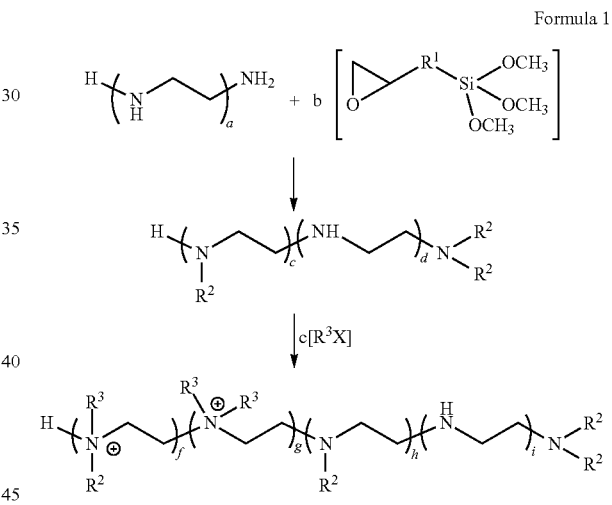

Formula 1 wherein $R^1$ is an alkylene chain or an alkylene chain substituted with heteroatoms, wherein $R^2$ is a Hydrogen or is represented by the general Formula 2, and wherein at least two $R^2$ groups are Formula 2:

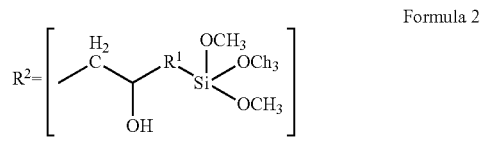

Formula 2 wherein $R^3$ is a hydrogen, an alkyl group, or a substituted alkyl group; X is a halide; a and b are integers greater than 1, where a<b; c-i are integers greater than 1; and c+d=a=f+g+h+i, where e<d. In some embodiments, the integers a-i may be several million. In other embodiments, the integers a-i may be about one million. In yet other embodiments, the integers a-i may be between about 100 and about 500, or between about 2 and 10.

In other embodiments, the multipodal silane coupling agent may have the general Formula 2:

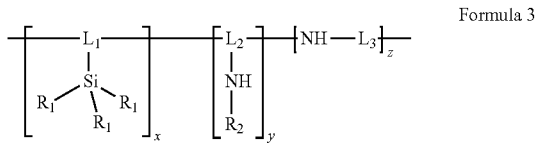

Formula 3 wherein $R_1$ is an alkoxy group or a halide; $L_1$, $L_2$, and $L_3$ are each spacer groups selected from the group consisting of an alkylene, an aliphatic group, an aromatic group, a cyclic group, a heterocyclic group, a saturated group, an unsaturated group, any substituted with at least one heteroatom, and any combination thereof; R2 is an organic substituent (e.g., hydrogen may be preferred in some embodiments); X is an integer greater than 1; and Y+Z is an integer greater than 0.

Examples of specific multipodal silane coupling agents that may be used with the methods of the present invention may include, but are not limited to, the following compounds, and any combination thereof:

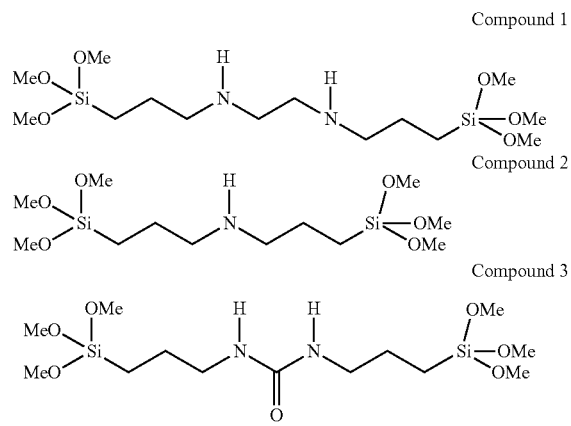

Compound 1

Compound 2

Compound 3

In some embodiments, the multipodal silane coupling agent may further comprise at least one cationic group. When used in a subterranean formation operation, the cationic group may further act to consolidate or stabilize loose particulates therein, such as by preventing or reducing swelling of clay formation fines by ion exchange. Any cationic group may be used in accordance with the embodiments described herein. In some embodiments, it may be preferred that the cationic group be an ammonium cation. Other cationic groups may include, but are not limited to, a phosphonium cation, a heteroaromatic cation, and the like.

The curable resin present in the consolidation compositions described in the present disclosure may be any resin capable of forming a hardened, consolidated mass ("cure"). Many such resins are commonly used in subterranean consolidation operations (without multipodal silane coupling agents) and may include, but are not limited to, an epoxy resin, an aliphatic epoxy resin (e.g., a glycidyl epoxy resin, a cycloaliphatic epoxide, and the like), a glycidylamine epoxy resin (e.g., triglycidyl-p-aminophenol, N,N,N,N-tetraglycidyl-4,4-methylenebis benzylamine, and the like), and combinations thereof.

The consolidation compositions disclosed herein comprise a resin hardening agent. The resin hardening agent may be used to facilitate the curing of the curable resin into a hardened, consolidated mass. The curable resin may require the resin hardening agent to begin the curing process or to complete the curing process (i.e., the resin hardening agent may act as an accelerator or a facilitator at any point in the curing process). Suitable resin hardening agents may be any hardening agent suitable for use with the curable resins described herein. Examples of suitable resin hardening agents may include, but are not limited to, a cyclo-aliphatic amine, an aromatic amine, an aliphatic amine, an acid, an acid anhydride, a phenol, an alcohol, a thiol, imidazole, pyrazole, pyrazine, pyrimidine, pyridazine, 1H-indazole, purine, phthalazine, naphthyridine, quinoxaline, quinazoline, phenazine, imidazolidine, cinnoline, imidazoline, 1,3,5-triazine, thiazole, pteridine, indazole, an amine, a polyamine, an amide, a polyamide, 2-ethyl-4-methyl imidazole, triethylenetetramine, ethylenediamine, N-cocoalkyltrimethylenediamine, isophoronediamene, diethyltolunendiamene, and any combination thereof.

In some embodiments, the consolidation compositions described herein may comprise the multipodal silane coupling agent in the range of between a lower limit of about 0.01%, 0.1%, 1%, 5%, 10%, 15%, 20%, 25%, 30%, 35%, and 40% to an upper limit of about 100%, 95%, 90%, 85%, 80%, 75%, 70%, 65%, 60%, 55%, 50%, 45%, and 40% by weight of the curable resin, encompassing any value and subset therebetween. In some embodiments, the resin hardening agent may be present in the consolidation compositions in the range of a lower limit of about 0.5% to an upper limit of about 50% by weight of the curable resin, or a lower limit of about 1% to an upper limit of about 15% by weight of the curable resin, encompassing any value and subset therebetween.

In some embodiments, the consolidation compositions described herein may further comprise a base fluid. The base fluid may be used as a carrier fluid or as a diluent, depending on the particular consolidation composition and/or the particular operation with which the consolidation composition is being utilized. Suitable base fluids may include, but are not limited to, oil base fluids, aqueous base fluids, aqueous-miscible base fluids, water-in-oil emulsion base fluids, or oil-in-water emulsion base fluids. Suitable oil base fluids may include, but are not limited to, alkanes, olefins, aromatic organic compounds, cyclic alkanes, paraffins, diesel fluids, mineral oils, desulfurized hydrogenated kerosenes, and any combination thereof. Suitable aqueous base fluids may include, but are not limited to, fresh water, saltwater (e.g., water containing one or more salts dissolved therein), brine (e.g., saturated salt water), seawater, and any combination thereof. Suitable aqueous-miscible base fluids may include, but are not limited to, alcohols (e.g., methanol, ethanol, n-propanol, isopropanol, n-butanol, sec-butanol, isobutanol, and t-butanol), glycerins, glycols (e.g., polyglycols, propylene glycol, and ethylene glycol), polyglycol amines, polyols, any derivative thereof, any in combination with salts (e.g., sodium chloride, calcium chloride, calcium bromide, zinc bromide, potassium carbonate, sodium formate, potassium formate, cesium formate, sodium acetate, potassium acetate, calcium acetate, ammonium acetate, ammonium chloride, ammonium bromide, sodium nitrate, potassium nitrate, ammonium nitrate, ammonium sulfate, calcium nitrate, sodium carbonate, and potassium carbonate), any in combination with an aqueous-based fluid, and any combination thereof. Suitable water-in-oil emulsion base fluids, also known as invert emulsions, may have an oil-to-water ratio from a lower limit of greater than about 50:50, 55:45, 60:40, 65:35, 70:30, 75:25, or 80:20 to an upper limit of less than about 100:0, 95:5, 90:10, 85:15, 80:20, 75:25, 70:30, or 65:35 by volume in the base fluid, encompassing any value and any subset therebetween. It should be noted that for water-in-oil and oil-in-water emulsion base fluids, any mixture of the above may be used including the water being and/or comprising an aqueous-miscible base fluid.

In various embodiments, the consolidation compositions described herein may be used to treat a subterranean formation having loose particulates therein, such as formation fines, proppant, or any combination thereof. Such particulates, in the case of formation fines may be present in the subterranean formation and coated with the consolidation composition by introducing the consolidation composition into the subterranean formation comprising such fines. That is, in some embodiments, the present disclosure provides a method of treating a subterranean formation comprising providing a treatment fluid comprising a base fluid and a consolidation composition. As described previously, the consolidation composition comprises a multipodal silane coupling agent comprising at least two silane groups and at least one amino group, a curable resin, and a resin hardening agent. The treatment fluid may then be introduced into a subterranean formation comprising a plurality of loose particulates (e.g., formation fines or proppant, such as proppant in a proppant pack). Upon contact with the loose particulates, the at least two silane groups in the multipodal silane coupling agent silylate to the surface of the particulates and the at least one amino group reacts to form crosslinks with the curable resin, thereby forming resin-coated particulates. That is, a portion of the multipodal silane coupling agent chemically attaches or absorbs onto the loose particulates and a portion of the multipodal silane coupling agent chemically attaches or absorbs the resin onto the loose particulate. The multipodal silane coupling agents provide improved and effective coupling of the resin onto the loose particulates such that only a thin layer of the resin is necessary to ensure consolidation, thus allowing improved permeability regain. Thereafter, the hardening agent cures the curable resin coating the resin-coated particulates, thereby at least partially consolidating the coated particulates against migration in the formation.

In some embodiments described herein, the multipodal silane coupling agent may have more than one amino group capable of reacting and forming crosslinks with the curable resin. In such embodiments, some, but not all, of the amino groups may be protonated or alkylated to form cations, which may further aid in stabilizing the loose particulates, for example, by preventing or reducing swelling of clay formation fines by ion exchange.

In other embodiments, the consolidation composition may be coated onto proppant particulates prior to their placement in a fracture for forming a consolidated proppant pack in a fracture in a subterranean formation. Specifically, the disclosure provides a method of providing a consolidation composition, wherein the consolidation composition comprises a multipodal silane coupling agent comprising at least two silane groups and at least one amino group, a curable resin, and a resin hardening agent. The consolidation composition may then be pre-coated onto proppant particulates, either prior to reaching the well site or at the well site, or may be coated on the proppant particulates on-the-fly. The term "on-the-fly," as used herein refers to performing an operation during a subterranean treatment that does not require stopping normal operations. That is, the pre-coated proppant may be placed in a treatment fluid comprising a base fluid and introduced into a subterranean formation or the consolidation composition, proppant particulates, and base fluid may be introduced simultaneously to form the treatment fluid, whereby the consolidation composition coats the proppant particulates as it is introduced and/or traveling in the formation. Either way, the resin-coated proppant particulates may be placed into at least one fracture in the formation, wherein the resin hardening agent may cure the curable resin coated on the resin-coated proppant particulates to form a consolidated proppant pack therein.

The consolidation composition described herein beneficially provides increased consolidation strength to the loose particulates (e.g., formation fines and/or proppant) compared to consolidation treatments using traditional non-multipodal silane coupling agents, or other types of coupling agents. The presence of the at least two silane groups on the multipodal silane coupling agent and the at least one amino group provide this advantage by enhancing the chemical bond formed between the multipodal silane coupling agent and both the curable resin and loose particulate and by providing enhanced cohesion between the individual particulates. Such benefits reduce the decrease in permeability regain, as discussed above, particularly in formations having high concentrations of formation fines, including clays. In some embodiments, the fines may have a concentration in the subterranean formation greater than at least about 4% to at least about 30% or more of the entire formation sand therein and a regain permeability of at least about 50% to about 99.9%, or 100%, may be achieved after consolidating the resin-coated particulates or proppant in the subterranean formation.

In some embodiments, the consolidation composition may further comprise non-multipodal silane coupling agents, in addition to the multipodal silane coupling agent. Such may be preferred if only a small amount of multipodal silane coupling agent is required to reap the benefits of the ability to reduce the amount of curable resin required (thus only minorly, if at all, affecting the permeability regain). In other embodiments, a consolidation composition is provided that consists essentially of a multipodal silane coupling agent comprising at least two silane groups and at least one amino group, a curable resin, and a resin hardening agent. In such an embodiment, no other silane coupling agent or similar agent is used to provide coupling between the resin and the particulates to be consolidated.

Traditional non-multipodal silane coupling agents may additionally be more readily available, as they have been used in the oil and gas industry for some time. When included, the ratio of multipodal coupling agent to non-multipodal silane coupling agent may be present in the range of from a lower limit of about 0.1:100, 10:90, 20:80, 30:70, 40:60, and 50:50 to an upper limit of about 100:0.1, 90:10, 80:20, 70:30, 60:40, and 50:50, or from about 1:9 to about 9:1, by weight of the multipodal silane coupling agent, encompassing any value and subset therebetween.

In various embodiments, systems may be configured for delivering the consolidation compositions in any form described herein (e.g., alone, diluted in a treatment fluid, coated onto a particulate, and the like) to a downhole location. In various embodiments, the systems can comprise a pump fluidly coupled to a tubular, the tubular containing the consolidation compositions. The pump may be a high pressure pump in some embodiments. As used herein, the term "high pressure pump" will refer to a pump that is capable of delivering a fluid downhole at a pressure of about 1000 psi or greater. A high pressure pump may be used when it is desired to introduce the consolidation compositions to a subterranean formation at or above a fracture gradient of the subterranean formation, but it may also be used in cases where fracturing is not desired. In some embodiments, the high pressure pump may be capable of fluidly conveying particulate matter, such as proppant particulates, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the consolidation compositions to the high pressure pump. In such embodiments, the low pressure pump may "step up" the pressure of the consolidation compositions before it reaches the high pressure pump.

In some embodiments, the systems described herein can further comprise a mixing tank that is upstream of the pump and in which the consolidation composition is formulated. In various embodiments, the pump (e.g., a low pressure pump, a high pressure pump, or a combination thereof) may convey the consolidation compositions from the mixing tank, or other source of the consolidation compositions, to the tubular. In other embodiments, however, the consolidation compositions can be formulated offsite and transported to a worksite, in which case the consolidation compositions may be introduced to the tubular via the pump directly from its shipping container (e.g., a truck, a railcar, a barge, or the like) or from a transport pipeline. In either case, the consolidation compositions may be drawn into the pump, elevated to an appropriate pressure, and then introduced into the tubular for delivery downhole.

The FIGURE shows an illustrative schematic of a system that can deliver consolidation compositions of the present disclosure to a downhole location, according to one or more embodiments. It should be noted that while the FIGURE generally depicts a land-based system, it is to be recognized that like systems may be operated in subsea locations as well. As depicted in the FIGURE, system 1 may include mixing tank 10, in which a consolidation composition of the present disclosure may be formulated. The consolidation compositions may be conveyed via line 12 to wellhead 14, where the consolidation compositions enter tubular 16, tubular 16 extending from wellhead 14 into subterranean formation 18. Upon being ejected from tubular 16, the consolidation compositions may subsequently penetrate into subterranean formation 18. In some instances, tubular 16 may have a plurality of orifices (not shown) through which the consolidation compositions of the present disclosure may enter the wellbore proximal to a portion of the subterranean formation 18 to be treated. In some instances, the wellbore may further comprise equipment or tools (not shown) for zonal isolation of a portion of the subterranean formation 18 to be treated.

Pump 20 may be configured to raise the pressure of the consolidation compositions to a desired degree before its introduction into tubular 16. It is to be recognized that system 1 is merely exemplary in nature and various additional components may be present that have not necessarily been depicted in the FIGURE in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in the FIGURE, the consolidation compositions may, in some embodiments, flow back to wellhead 14 and exit subterranean formation 18. In some embodiments, the consolidation composition that has flowed back to wellhead 14 may subsequently be recovered and recirculated to subterranean formation 18.

It is also to be recognized that the disclosed consolidation compositions may also directly or indirectly affect the various downhole equipment and tools that may come into contact with the consolidation compositions during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in the FIGURE.

Embodiments disclosed herein include:

Embodiment A

A consolidation composition comprising: a multipodal silane coupling agent comprising at least two silane groups and at least one amino group; a curable resin; and a resin hardening agent.

Embodiment A may have one or more of the following additional elements in any combination:

Element A1: Wherein the curable resin is selected from the group consisting of an epoxy resin, an aliphatic epoxy resin, a glycidylamine epoxy resin, and combinations thereof.

Element A2: Further comprising a resin hardening agent selected from the group consisting of a cyclo-aliphatic amine, and aromatic amine, and aliphatic amine, an acid, an acid anhydride, a phenol, an alcohol, a thiol, imidazole, pyrazole, pyrazine, pyrimidine, pyridazine, 1H-indazole, purine, phthalazine, naphthyridine, quinoxaline, quinazoline, phenazine, imidazolidine, cinnoline, imidazoline, 1,3, 5-triazine, thiazole, pteridine, indazole, an amine, a polyamine, an amide, a polyamide, 2-ethyl-4-methyl imidazole, triethylenetetramine, ethylenediamine, N-cocoalkyltrimethylenediamine, isophoronediamene, diethyltolunendiamene, and any combination thereof.

Element A3: Wherein the multipodal silane coupling agent further comprises at least one cationic group.

Element A4: Wherein the cationic group is an ammonium cation, a phosphonium cation, a heteroaromatic cation, and any combination thereof.

Element A5: Wherein the multipodal silane coupling agent has the general formula:

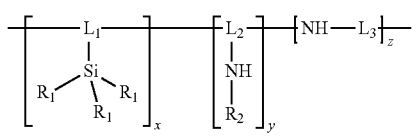

wherein $R_1$ is an alkoxy group or a halide; $L_1$, $L_2$, and $L_3$ are each spacer groups selected from the group consisting of an alkylene group, an alkoxylene group, an aliphatic group, an aromatic group, a cyclic group, a heterocyclic group, a saturated group, an unsaturated group, any substituted with at least one heteroatom, and any combination thereof; $R_2$ is an organic substituent; X is an integer greater than 1; and Y+Z is an integer greater than 0.

Element A6: wherein the multipodal silane coupling agent is selected from the group consisting of:

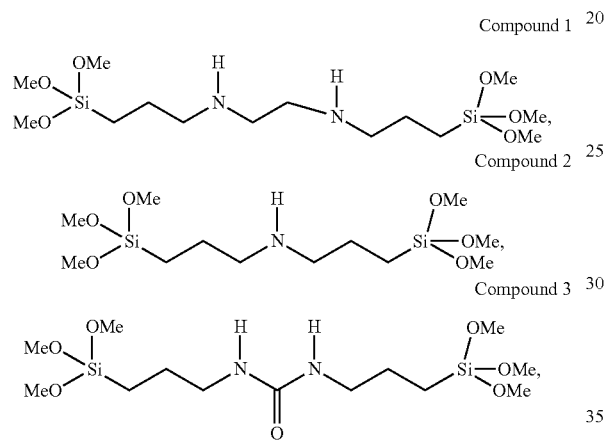

and any combination thereof.

Element A7: Wherein the consolidation composition further comprises a non-multipodal silane coupling agent.

By way of non-limiting example, combinations applicable to Embodiment A include: A with A1 and A4; A with A5 and A6; A with A1 and A2; A with A3, A4, and A5; A with A3 and A4; A with A4 and A7; A with A5, A6, and A7.

Embodiment B

A method comprising: providing a consolidation composition, wherein the consolidation composition comprises a multipodal silane coupling agent comprising at least two silane groups and at least one amino group, a curable resin, and a resin hardening agent; introducing the consolidation composition into a subterranean formation comprising a plurality of loose particulates, wherein the at least two silane groups silylate to a surface of the particulates and the at least one amino group reacts to form crosslinks with the curable resin, thereby forming resin-coated particulates; and curing the curable resin on the resin-coated particulates with the resin hardening agent, thereby at least partially consolidating the resin-coated particulates in the subterranean formation against substantial migration by curing the curable.

Embodiment B may have one or more of the following additional elements in any combination:

Element B1: Wherein the curable resin is selected from the group consisting of an epoxy resin, an aliphatic epoxy resin, a glycidylamine epoxy resin, and combinations thereof.

Element B2: Further comprising a resin hardening agent selected from the group consisting of a cyclo-aliphatic amine, and aromatic amine, and aliphatic amine, an acid, an acid anhydride, a phenol, an alcohol, a thiol, imidazole, pyrazole, pyrazine, pyrimidine, pyridazine, 1H-indazole, purine, phthalazine, naphthyridine, quinoxaline, quinazoline, phenazine, imidazolidine, cinnoline, imidazoline, 1,3,5-triazine, thiazole, pteridine, indazole, an amine, a polyamine, an amide, a polyamide, 2-ethyl-4-methyl imidazole, triethylenetetramine, ethylenediamine, N-cocoalkylt-rimethylenediamine, isophoronediamene, diethyltolunendi-amene, and any combination thereof.

Element B3: Wherein the multipodal silane coupling agent further comprises at least one cationic group.

Element B4: Wherein the cationic group is an ammonium cation, a phosphonium cation, a heteroaromatic cation, and any combination thereof.

Element B5: Wherein the multipodal silane coupling agent has the general formula:

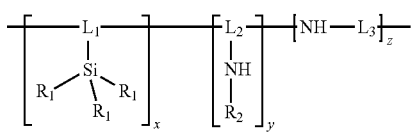

wherein $R_1$ is an alkoxy group or a halide; $L_1$, $L_2$, and $L_3$ are each spacer groups selected from the group consisting of an alkylene group, an alkoxylene group, an aliphatic group, an aromatic group, a cyclic group, a heterocyclic group, a saturated group, an unsaturated group, any substituted with at least one heteroatom, and any combination thereof; $R_2$ is an organic substituent; X is an integer greater than 1; and Y+Z is an integer greater than 0.

Element B6: wherein the multipodal silane coupling agent is selected from the group consisting of:

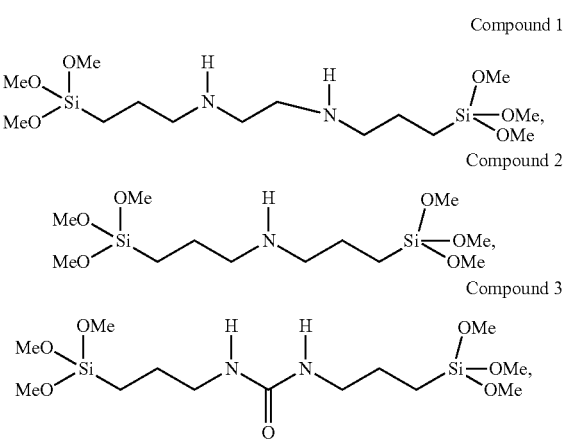

and any combination thereof.

Element B7: Wherein the loose particulates comprise at least one selected from the group consisting of formation fines, proppant, and any combination thereof.

Element B8: Wherein the loose particulates are formation fines in a concentration in the subterranean formation greater than at least about 4% and a regain permeability of at least about 50% is achieved after consolidating the resin-coated particulates in the subterranean formation against substantial migration.

Element B9: Wherein the resin-coated proppant particulates exhibit an increased consolidation strength as compared to if the consolidation composition included a non-multipodal silane coupling agent and not the multipodal silane coupling agent.

Element B10: Wherein the consolidation composition further comprises a non-multipodal silane coupling agent.

Element B11: Further comprising a wellhead with a tubular extending therefrom and into the subterranean formation and having a pump fluidly coupled to the tubular, wherein the step of: introducing the consolidation composition into a subterranean formation comprising a plurality of loose particulates, comprises introducing the consolidation composition through the tubular.

By way of non-limiting example, combinations applicable to Embodiment B include: B with B2, B3, and B9; B with B6 and B8; B with B4 and B7; B with B1 and B2; B with B2, B6, B7, and B9; B with B8 and B10; B with B1, B2, B6, and B10; B with B1 and B11; B with B3, B4, and B11.

Embodiment C

A method comprising: providing a consolidation composition and proppant particulates, wherein the consolidation composition comprises a multipodal silane coupling agent comprising at least two silane groups and at least one amino group, a curable resin, and a resin hardening agent; coating the proppant particulates with the consolidation composition, wherein the at least two silane groups silylate to a surface of the particulates and the at least one amino group reacts to form crosslinks with the curable resin, thereby forming resin-coated proppant particulates; introducing the resin-coated proppant particulates into a subterranean formation in a treatment fluid comprising a base fluid; and placing the resin-coated proppant particulates into at least one fracture in the subterranean formation; and curing the curable resin on the resin-coated particulates with the resin hardening agent, thereby forming a consolidated proppant pack.

Embodiment C may have one or more of the following additional elements in any combination:

Element C1: Wherein the curable resin is selected from the group consisting of an epoxy resin, an aliphatic epoxy resin, a glycidylamine epoxy resin, and combinations thereof.

Element C2: Further comprising a resin hardening agent selected from the group consisting of a cyclo-aliphatic amine, and aromatic amine, and aliphatic amine, an acid, an acid anhydride, a phenol, an alcohol, a thiol, imidazole, pyrazole, pyrazine, pyrimidine, pyridazine, 1H-indazole, purine, phthalazine, naphthyridine, quinoxaline, quinazoline, phenazine, imidazolidine, cinnoline, imidazoline, 1,3,5-triazine, thiazole, pteridine, indazole, an amine, a polyamine, an amide, a polyamide, 2-ethyl-4-methyl imidazole, triethylenetetramine, ethylenediamine, N-cocoalkyltrimethylenediamine, isophoronediamene, diethyltolunendiamene, and any combination thereof.

Element C3: Wherein the multipodal silane coupling agent further comprises at least one cationic group.

Element C4: Wherein the cationic group is an ammonium cation, a phosphonium cation, a heteroaromatic cation, and any combination thereof.

Element C5: Wherein the multipodal silane coupling agent has the general formula:

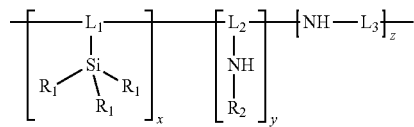

wherein $R_1$ is an alkoxy group or a halide; $L_1$, $L_2$, and $L_3$ are each spacer groups selected from the group consisting of an alkylene group, an alkoxylene group, an aliphatic group, an aromatic group, a cyclic group, a heterocyclic group, a saturated group, an unsaturated group, any substituted with at least one heteroatom, and any combination thereof; $R_2$ is an organic substituent; X is an integer greater than 1; and Y+Z is an integer greater than 0.

Element C6: wherein the multipodal silane coupling agent is selected from the group consisting of:

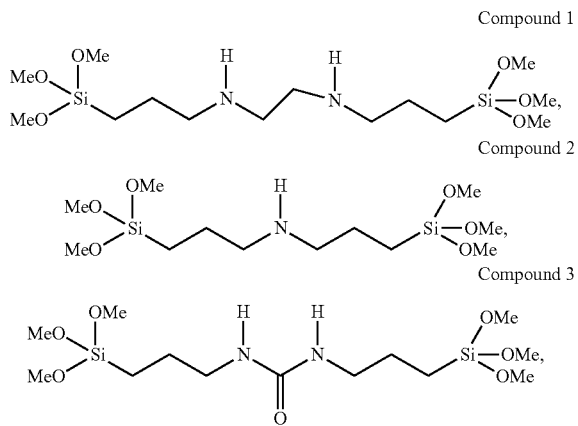

and any combination thereof.

Element C7: Wherein the consolidated proppant pack after curing exhibits an increased consolidation strength as compared to if the consolidation composition included a non-multipodal silane coupling agent and not the multipodal silane coupling agent.

Element C8: Wherein the consolidation composition further comprises a non-multipodal silane coupling agent.

Element C9: Further comprising a wellhead with a tubular extending therefrom and into the subterranean formation and having a pump fluidly coupled to the tubular, wherein the step of: introducing the resin-coated proppant particulates into a subterranean formation in a treatment fluid comprising a base fluid, comprises introducing the resin-coated proppant particulates through the tubular.

By way of non-limiting example, combinations applicable to Embodiment C include: C with C1 and C7; C with C2, C4, and C8; C with C3 and C8; C with C7 and C8; C with C5, C6, and C7; C with C1 and C9; C with C7, C8, and C9.

Therefore, the embodiments disclosed herein are well adapted to attain the ends and advantages mentioned as well as those that are inherent therein. The particular embodiments disclosed above are illustrative only, as they may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A consolidation composition comprising:
a multipodal silane coupling agent comprising at least two silane groups and at least one amino group;
a curable resin; and
a resin hardening agent,
wherein the multipodal silane coupling agent has the formula:

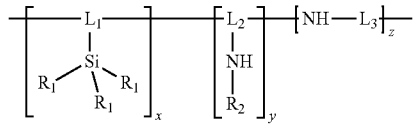

wherein $R_1$ is an alkoxy group or a halide;
$L_1$, $L_2$, and $L_3$ are each spacer groups selected from the group consisting of an alkylene group, an alkoxylene group, an aliphatic group, an aromatic group, a cyclic group, a heterocyclic group, a saturated group, an unsaturated group, any substituted with at least one heteroatom, and any combination thereof;
$R_2$ is an organic substituent;
X is an integer greater than 1;
Y is an integer greater than or equal to 0; and
Z is an integer greater than 0, or
the multipodal silane coupling agent is selected from the group consisting of:

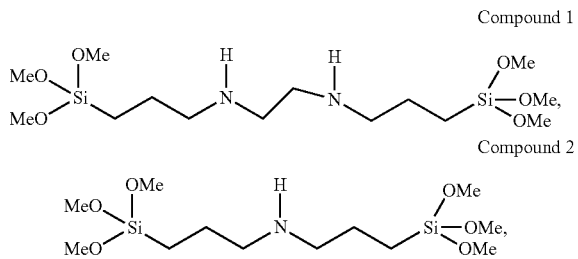

Compound 3

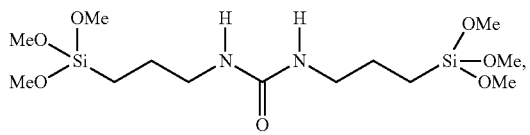

and any combination thereof.

2. The composition of claim 1, wherein the curable resin is selected from the group consisting of an epoxy resin, an aliphatic epoxy resin, a glycidylamine epoxy resin, and combinations thereof.

3. The composition of claim 1, further comprising a resin hardening agent selected from the group consisting of a cyclo-aliphatic amine, and aromatic amine, and aliphatic amine, an acid, an acid anhydride, a phenol, an alcohol, a thiol, imidazole, pyrazole, pyrazine, pyrimidine, pyridazine, 1H-indazole, purine, phthalazine, naphthyridine, quinoxaline, quinazoline, phenazine, imidazolidine, cinnoline, imidazoline, 1,3,5-triazine, thiazole, pteridine, indazole, an amine, a polyamine, an amide, a polyamide, 2-ethyl-4-methyl imidazole, triethylenetetramine, ethylenediamine, N-cocoalkyltrimethylenediamine, isophoronediamene, diethyltolunendiamene, and any combination thereof.

4. The composition of claim 1, wherein the multipodal silane coupling agent further comprises at least one cationic group.

5. The composition of claim 4, wherein the cationic group is an ammonium cation, a phosphonium cation, a heteroaromatic cation, and any combination thereof.

6. The composition of claim 1, wherein the multipodal silane coupling agent has the formula:

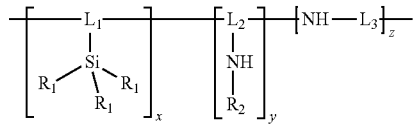

wherein $R_1$ is an alkoxy group or a halide;
$L_1$, $L_2$, and $L_3$ are each spacer groups selected from the group consisting of an alkylene group, an alkoxylene group, an aliphatic group, an aromatic group, a cyclic group, a heterocyclic group, a saturated group, an unsaturated group, any substituted with at least one heteroatom, and any combination thereof;
$R_2$ is an organic substituent;
X is an integer greater than 1;
Y is an integer greater than or equal to 0; and
Z is an integer greater than 0.

7. The composition of claim 1, wherein the multipodal silane coupling agent is selected from the group consisting of:

Compound 1

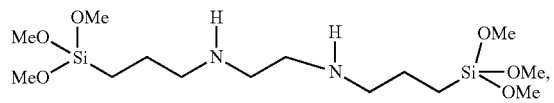

-continued

Compound 2

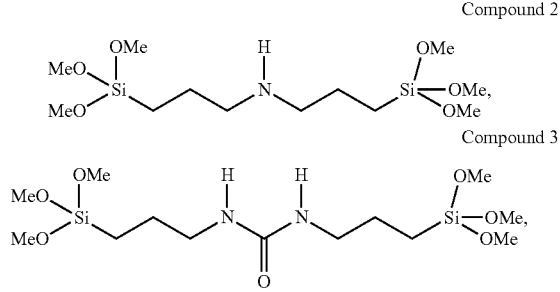

Compound 3

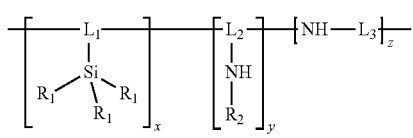

and any combination thereof.

8. The composition of claim 1, further comprising a non-multipodal silane coupling agent.

9. A method comprising:
  providing a consolidation composition,
   wherein the consolidation composition comprises a multipodal silane coupling agent comprising at least two silane groups and at least one amino group, a curable resin, and a resin hardening agent;
  introducing the consolidation composition into a subterranean formation comprising a plurality of loose particulates,
   wherein the at least two silane groups silylate to a surface of the particulates and the at least one amino group reacts to form crosslinks with the curable resin, thereby forming resin-coated particulates; and
  curing the curable resin on the resin-coated particulates with the resin hardening agent, thereby at least partially consolidating the resin-coated particulates in the subterranean formation against substantial migration by curing the curable resin,
   wherein the multipodal silane coupling agent has the formula:

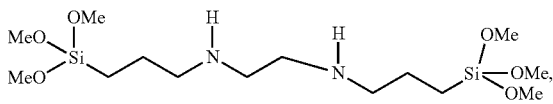

wherein $R_1$ is an alkoxy group or a halide;
  $L_1$, $L_2$, and $L_3$ are each spacer groups selected from the group consisting of an alkylene group, an alkoxylene group, an aliphatic group, an aromatic group, a cyclic group, a heterocyclic group, a saturated group, an unsaturated group, any substituted with at least one heteroatom, and any combination thereof;
  $R_2$ is an organic substituent;
  X is an integer greater than 1;
  Y is an integer greater than or equal to 0; and
  Z is an integer greater than 0, or
the multipodal silane coupling agent is selected from the group consisting of:

Compound 1

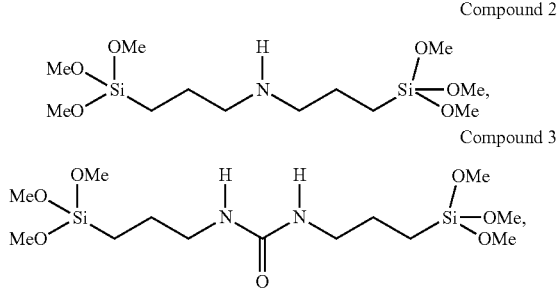

Compound 3

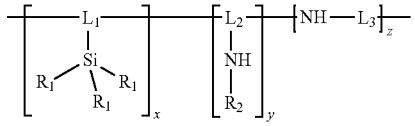

and any combination thereof.

10. The method of claim 9, wherein the loose particulates comprise at least one selected from the group consisting of formation fines, proppant, and any combination thereof.

11. The method of claim 10, wherein the formation fines concentration in the subterranean formation greater than at least about 4% and a regain permeability of at least about 50% is achieved after consolidating the resin-coated particulates in the subterranean formation against substantial migration.

12. The method of claim 9, wherein the consolidated resin-coated particulates exhibit an increased consolidation strength as compared to if the consolidation composition included a non-multipodal silane coupling agent and not the multipodal silane coupling agent.

13. The method of claim 9, wherein the multipodal silane coupling agent further comprises at least one cationic group.

14. The method of claim 13, wherein the cationic group is an ammonium cation, a phosphonium cation, a heteroaromatic cation, and any combination thereof.

15. The method of claim 9, wherein the multipodal silane coupling agent has the formula:

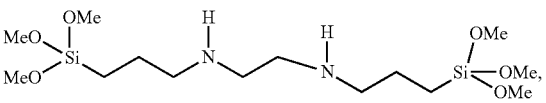

wherein $R_1$ is an alkoxy group or a halide;
  $L_1$, $L_2$, and $L_3$ are each spacer groups selected from the group consisting of an alkylene group, an alkoxylene group, an aliphatic group, an aromatic group, a cyclic group, a heterocyclic group, a saturated group, an unsaturated group, any substituted with at least one heteroatom, and any combination thereof;
  $R_2$ is an organic substituent;
  X is an integer greater than 1;
  Y is an integer greater than or equal to 0; and
  Z is an integer greater than 0.

16. The method of claim 9, wherein the multipodal silane coupling agent is selected from the group consisting of:

Compound 1

-continued

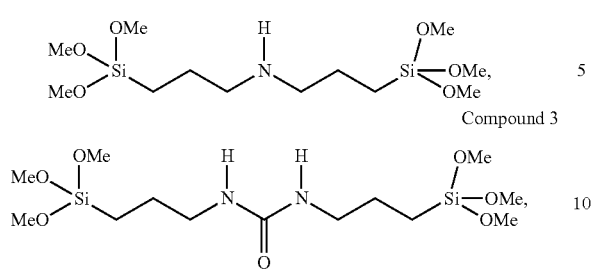

Compound 2

Compound 3 and any combination thereof.

17. The method of claim 9, wherein the consolidation composition further comprises a non-multipodal silane coupling agent.

18. The method of claim 9, further comprising a wellhead with a tubular extending therefrom and into the subterranean formation and having a pump fluidly coupled to the tubular, wherein the step of: introducing the consolidation composition into a subterranean formation comprising a plurality of loose particulates, comprises introducing the consolidation composition through the tubular.

19. A method comprising:
providing a consolidation composition and proppant particulates,
wherein the consolidation composition comprises a multipodal silane coupling agent comprising at least two silane groups and at least one amino group, a curable resin, and a resin hardening agent;
coating the proppant particulates with the consolidation composition,
wherein the at least two silane groups silylate to a surface of the particulates and the at least one amino group reacts to form crosslinks with the curable resin, thereby forming resin-coated proppant particulates;
introducing the resin-coated proppant particulates into a subterranean formation in a treatment fluid comprising a base fluid; and
placing the resin-coated proppant particulates into at least one fracture in the subterranean formation; and
curing the curable resin on the resin-coated particulates with the resin hardening agent, thereby forming a consolidated proppant pack,
wherein the multipodal silane coupling agent has the formula:

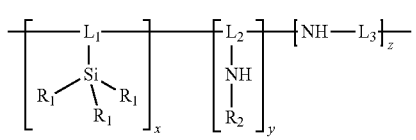

wherein $R_1$ is an alkoxy group or a halide;
$L_1$, $L_2$, and $L_3$ are each spacer groups selected from the group consisting of an alkylene group, an alkoxylene group, an aliphatic group, an aromatic group, a cyclic group, a heterocyclic group, a saturated group, an unsaturated group, any substituted with at least one heteroatom, and any combination thereof;
$R_2$ is an organic substituent;
X is an integer greater than 1;
Y is an integer greater than or equal to 0; and
Z is an integer greater than 0, or the multipodal silane coupling agent is selected from the group consisting of:

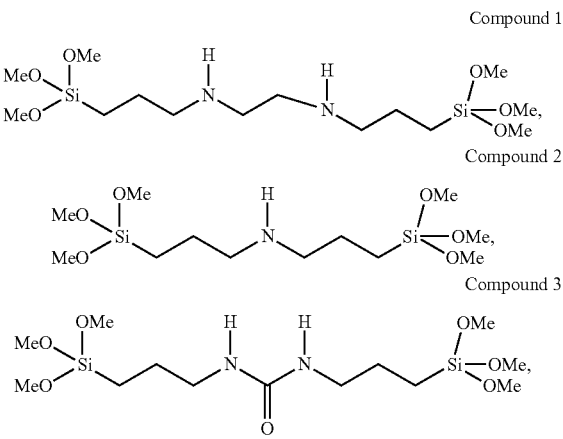

Compound 1

Compound 2

Compound 3 and any combination thereof.

20. The method of claim 19, wherein the consolidated proppant pack after curing exhibits an increased consolidation strength as compared to if the consolidation composition included a non-multipodal silane coupling agent and not the multipodal silane coupling agent.

21. The method of claim 19, wherein the multipodal silane coupling agent further comprises at least one cationic group.

22. The method of claim 19, wherein the multipodal silane coupling agent has the formula:

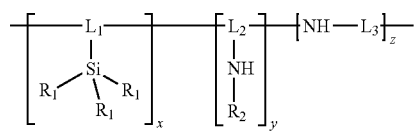

wherein $R_1$ is an alkoxy group or a halide;
$L_1$, $L_2$, and $L_3$ are each spacer groups selected from the group consisting of an alkylene group, an alkoxylene group, an aliphatic group, an aromatic group, a cyclic group, a heterocyclic group, a saturated group, an unsaturated group, any substituted with at least one heteroatom, and any combination thereof;
$R_2$ is an organic substituent;
X is an integer greater than 1;
Y is an integer greater than or equal to 0; and
Z is an integer greater than 0.

23. The method of claim 19, wherein the multipodal silane coupling agent is selected from the group consisting of:

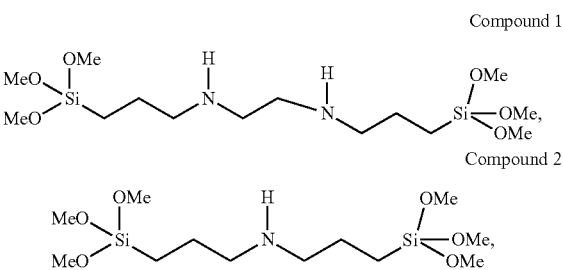

Compound 1

Compound 2

-continued

Compound 3

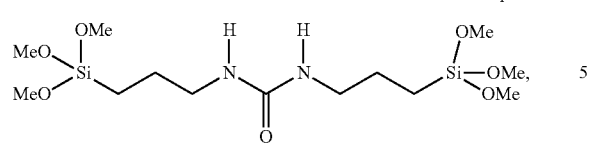

and any combination thereof.

24. The method of claim 19, wherein the consolidation composition further comprises a non-multipodal silane coupling agent.

25. The method of claim 19, further comprising a wellhead with a tubular extending therefrom and into the subterranean formation and having a pump fluidly coupled to the tubular, wherein the step of: introducing the resin-coated proppant particulates into a subterranean formation in a treatment fluid comprising a base fluid, comprises introducing the resin-coated proppant particulates through the tubular.

* * * * *